UNITED STATES PATENT OFFICE.

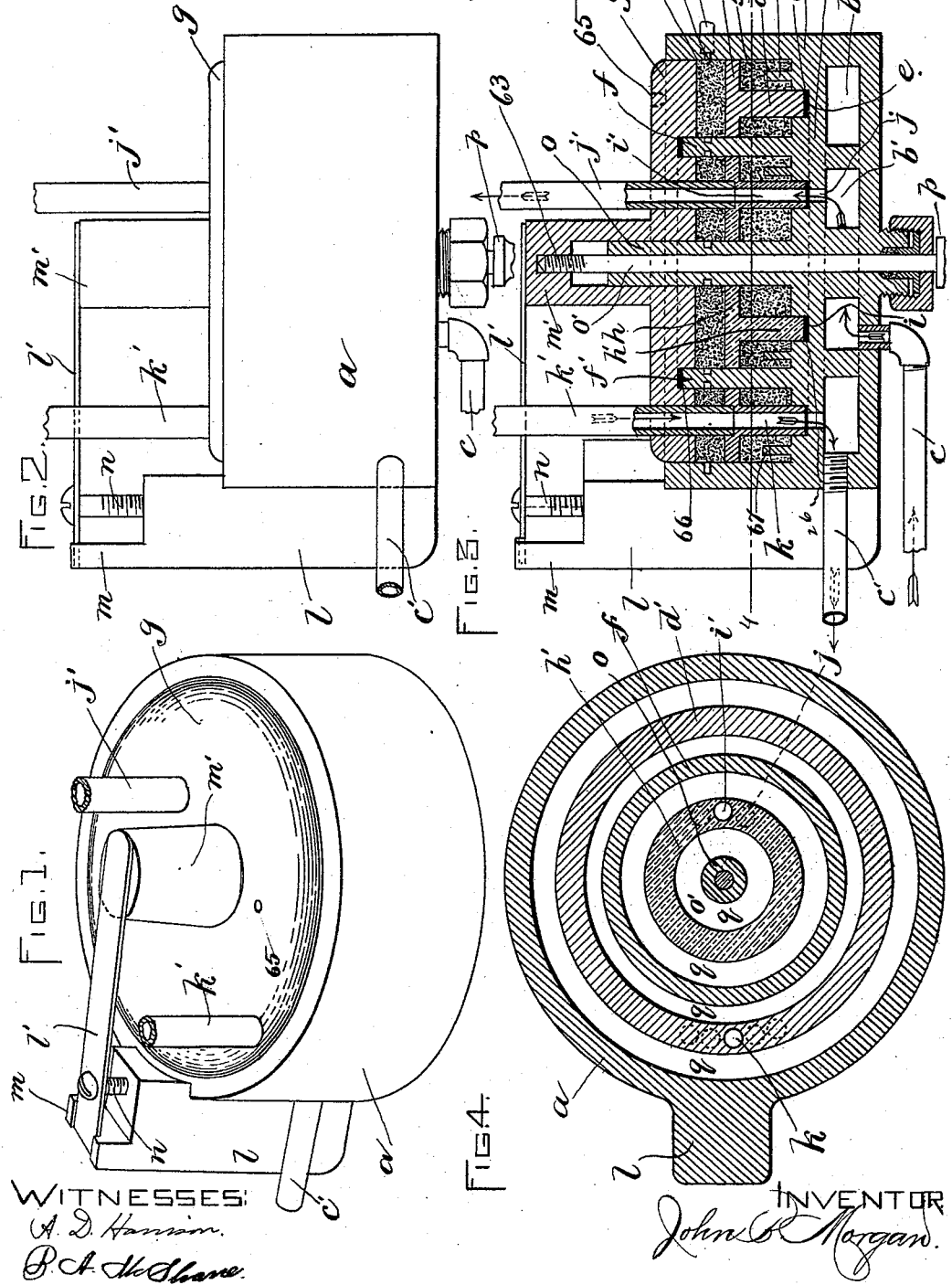

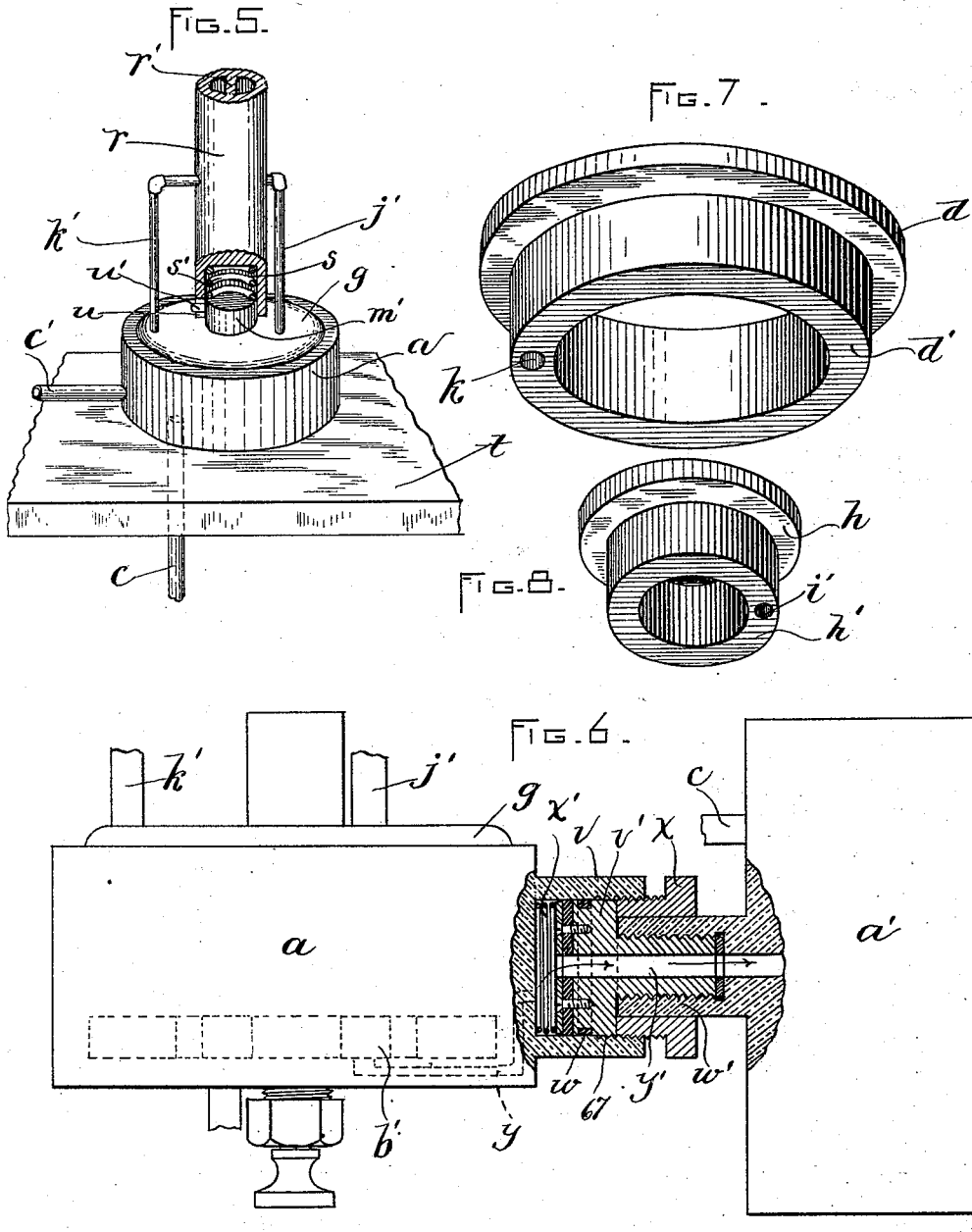

JOHN B. MORGAN, OF MIDDLEBOROUGH, MASSACHUSETTS.

CONCENTRIC STEAM-JOINT.

SPECIFICATION forming part of Letters Patent No. 485,596, dated November 1, 1892.

Application filed December 14, 1891. Serial No. 414,931. (No model.)

*To all whom it may concern:*

Be it known that I, JOHN B. MORGAN, of Middleborough, in the county of Plymouth and State of Massachusetts, have invented certain new and useful Improvements in Concentric Steam-Joints, of which the following is a specification.

This invention relates to "steam-joints."

It has for its object the provision of a device adapted to convey dry steam or heated air, gas, or the like from a stationary or non-rotating supply to a rotating or partially-rotating pipe or shaft, and thereby provide a joint with a solid face and a raised seat integral with the sides, which shall be substantially steam-tight with the minimum of friction between packing in concentric chambers and the rotating and stationary parts of the same, the direct and return conduits operating concentrically, the return-conduit incasing or surrounding the direct conduit.

The advantage of this construction, in addition to others, which will appear hereinafter, is that the direct steam being, as it were, inclosed or incased by the return steam is protected to a high degree against condensation by radiation of heat therefrom in its passage through the joint. The water in the pipes having been previously returned to the boiler, the steam by my improved joint is kept hotter, and consequently acts quicker and with better results than is the case with the commonly-employed means in the use of rubber pipe, where motion is required and where the steam is so exposed as to cause condensation.

To these ends my invention consists in the improvements which I will now proceed to describe and claim.

Of the accompanying drawings, forming a part of this specification, Figure 1 represents a perspective view of the steam compound joint embodying my improvements, showing the necessary pipes connected thereto as being broken off. Fig. 2 is a side elevation of the same. Fig. 3 is a vertical sectional view of the same. Fig. 4 is a horizontal sectional view on the line 4 4 of Fig. 3, hereinafter described. Fig. 5 is a perspective view on a smaller scale, showing the manner of connecting the pipes to the rotary shaft or pipe and how the device may be supported. Fig. 6 is a side view showing one way of joining or connecting the device so that two or more may be operated together at right angles to each other or otherwise arranged to deliver steam to shafts or pipes of a machine in different direction or to other joints. Figs. 7 and 8 are detail views hereinafter described.

The same letters and figures of reference indicate the same parts in all of the views.

In the drawings, $a$ represents an annular shell or casing provided with reservoirs $b\ b'$. The reservoir $b'$ communicates with the annular steam-chamber 26 and is adapted to receive steam from a pipe $c$, which is the direct inlet or inductive pipe, and the reservoir $b$ communicates with the annular steam-chamber 62 and a pipe $c'$, which is the outlet or return pipe, which disposes of the steam after it has been reduced in temperature by use. The chambers 62 and 26 provide means whereby the pipes $j'\ k'$ may communicate with the chambers $b'\ b$ no matter what may be the position of said pipes.

$d$ is a ring having on its under side a downwardly-projecting annular flange $d'$, Fig. 7, which flange is adapted to fit in, though not so as to touch, the bottom of an annular groove $e$, formed in the casing $a$, as shown in Fig. 3. Said flange is adapted to fit in the groove $e$ with a working fit, so that it may move therein freely, as will be fully explained hereinafter. The space between the bottom of the groove $e$ and the bottom of the flange $d'$ constitutes the annular steam-chamber 62.

$f$ represents an annular flange formed integral with the face 59 of the casing $a$, the upper edge of said flange entering an annular groove $f'$ in a cover $g$, upon which flange said cover may be adjusted (though not so as that the flange shall touch the bottom of the groove) with a working fit, as is also the fit of the cover in the upper end of the casing $a$.

$h$ represents a ring having a flange $h'$ on its under side, Fig. 8, which flange $h'$ fits in the groove $i$ in the solid face 59 of the casing $a$, the space between the bottom of the groove $i$ and bottom of the flange $h'$ forming the annular steam-chamber 26. The flange $h'$ is provided with an opening or port $i'$, which communicates with the annular chamber 26, and a series of ports and openings $j$ in the chamber $b'$ of the solid face 59 of the casing, in order to allow the steam to be admitted from said chamber $b'$, the chamber 26, and the port $i'$, and through the said port to a pipe $j'$, the bottom end of which is suitably secured to the disk $h$, as seen most clearly in Fig. 3, the object of which I will hereinafter explain.

$k$ represents a port or passage formed through the flange $d'$ of the ring $d$, Figs. 3 and 8, which port communicates with the chamber 62 and reservoir $b$ and registers with a pipe $k'$ in like manner as port $i'$ and pipe $j'$, hereinbefore described.

The casing $a$ is provided with a boss $l$, formed on one side thereof, which may be employed to secure said casing to any suitable support and to serve as a means of support for a spring $l'$, which spring is adapted to exert a sufficient pressure upon the cover $g$ by the means most clearly shown in Fig. 1. The upper end of the boss $l$ is provided with a projection $m$, upon which the outer end of spring $l'$ is adapted to rest, the inner end of the same bearing upon a projection $m'$, formed on the center of the cover $g$, the pressure of the spring being regulated by a screw $n$, passing through said spring and screwed into the boss $l$.

$o$ represents a sleeve, Figs. 3 and 4, formed integral with the solid face 59 of the casing $a$ and central thereon, which sleeve extends vertically through the cover $g$ and into the projection $m'$ formed thereon, and $o'$ represents a screw loosely fitted in said sleeve and secured at its upper end to the projection $m'$ by a screw-threaded connection and provided with a head $p$ on its bottom end, the arrangement being such that said bolt acts as a retainer of the cover in case an undue pressure of steam should accidentally be brought to bear against the under side of flange $h'$ in the chamber 26 sufficient to cause the latter to be raised from its seat and overcome the pressure of spring $l'$.

The bottom of the casing $a$ is provided with a stuffing-box and packing-nut, by which the packing may be pressed against the screw to secure it normally in the position shown and exert a pressure approximately to that of the weight of the cover $g$, so that the bearing of the latter may be maintained upon its seat, as will be understood by reference to Fig. 3. The spaces $q$ between the flanges of the rings are filled with suitable packing of such nature that will insure non-leakage of steam and at the same time allow of the free rotation of said rings and cover $g$.

I have shown in Fig. 5 a construction preferably to be used in connection with a continuously-rotating shaft $r$, said shaft being supported independently of the device and being hollow, with a partition (or it may be an inner pipe) through its center, the construction being such that the steam may enter the shaft through pipe $j'$ and leave the same through pipe $k'$, so that any desired degree of heat may be obtained, according to the quantity of steam admitted.

The bottom of pipe or shaft $r$ is provided with a chamber $s$, in which is a coiled spring, the bottom end of which bears upon the projection $m'$ of the cover $g$ with sufficient force to form a tight joint, the casing $a$ in this instance resting upon a support $t$, which may be adjustable vertically, so as to regulate the tension of said spring upon the cover, as will be understood by reference to the above-mentioned figure. The hollow shaft $r$ is provided with a slot $u$ at its bottom where it encircles the projection $m'$, through which extends a pin $u'$, secured to the projection $m'$, the arrangement being such that motion may be communicated to the cover $g$ from the shaft without straining the pipes $j'$ $k'$.

In the arrangement of the spring $l'$, as shown in Figs. 1, 2, and 3, it is intended that the amount of rotation of the cover shall be limited or oscillating in character, as when attached to certain classes of machines whose shafts make only a partial revolution, as in laundry or shoe machines, &c., requiring to be heated while in motion.

In Fig. 6 I have shown the casings $a$ $a'$ as connected together at right angles to each other, the object being to accommodate the device to machines having shafts at different angles to which it is necessary to apply steam. In this instance I form a flange or cylinder $v$ upon one side of the casing $a$, into which I fit a piston suitably provided with packing $w$. Said piston is secured to a projection $w'$, formed on the bottom of the casing $a'$ and surrounded by an annular nut $x$. A spring $x'$ is interposed between the piston and bottom of the cylinder, so that the piston may bear against the nut sufficiently to prevent slack therebetween and form a connection whereby the casing $a'$ may rotate; or, if required, the piston may be forced against the spring by the nut $x$, so that said piston and casing may be held stationary.

The steam, liquid, air, or other gas required to supply the casing $a'$ is passed into the latter from the reservoir $b'$ in the casing $a$ through a port $y$, cored out in the casting, and, entering the space between the piston and bottom of the cylinder $v$, passes into the casing $a'$ through the piston by a passage $y'$, formed in the latter.

The operation as a whole is as follows: In the construction shown in Figs. 1, 2, and 3, in which the movement of the cover is limited, as hereinbefore described, the connection of pipes $j'$ $k'$ being made with a shaft in the manner shown in Fig. 5, the steam or other heating agent is admitted through pipe $c$ into the reservoir $b'$ and passes in the direction of the arrows, Fig. 3, through the port $j$ and port $i'$ into the pipe $j'$, by which pipe it is conducted to the object to be heated, or it may be another joint, after which it returns through pipe $k'$ and down into the reservoir $b$ and out through the pipe $c'$, which conducts it back to the source of supply or other point. The pipes $j'$ $k'$, being connected to the shaft at a short distance above the projection $m'$, act to communicate the rotation of the shaft to the cover and the rings $d$ and $h$, the flanges $h'$ $d'$ of which extending in the grooves are by the rotating or oscillating movement worn to a uniform bearing and are kept practically tight by their own movement, as is also the case with the flange $f$, bearing in the groove $f'$ in the cover $g$.

Further features of the invention (some of which have, however, been before mentioned) may be enumerated as follows: 51 designates the packing between the cover and ring $d$; 52, the condensing retarder or cavity to catch the water that would otherwise be forced through the joints; 58, raised seat on solid face; 53, forked packing embracing raised seat 58; 59, solid face of casing $a$ above the chambers $b$ $b'$; 63, screw to act with or independent of the spring $l'$; 65, holes for wrench or spanner to cover $g$; 66 and 67, spaces to allow of adjustment, and 64 pipe for escape of waste or condensed steam.

It is to be noted that either the casing or cover may be made movable, one or the other remaining stationary, or both may be made movable, and that the movement may be oscillatory, rotary, or of other nature.

The invention is not, of course, confined to use with steam, since it is obvious that it may be employed in the use of air or other gas or fluid to which it may be adapted.

By the construction shown I am enabled to provide a joint which is cheap and durable, one of the principal advantages of which is that it keeps itself tight by its own motion and is susceptible of being kept hot enough by the means provided for the circulation, so that there is no condensation of steam therein, which is a great advantage in this device.

What I claim is—

1. A steam-joint comprising in its construction a casing provided with the concentric chambers $b$ $b'$ and 62 26, movable covers to the latter chambers, ports communicating between the chambers $b$ 62 and $b'$ 26, supply or inflow pipes communicating with the chambers $b'$ 26, and return-pipes communicating with the chambers $b$ 62, as set forth.

2. A steam-joint comprising in its construction a casing provided with concentric chambers $b$ $b'$ and 62 26, movable covers to the latter chambers, ports communicating between the chambers $b$ 62 and $b'$ 26, supply inflow-pipes communicating with the chambers $b'$ 26, return-pipes communicating with the chambers $b$ 62, and flanges and packing separating the said pipes between the base of the said casing and the cover to the chambers 62 26, as set forth.

3. A steam-joint comprising in its construction a casing provided with the concentric chambers $b$ $b'$ and 62 26 and having the annular flange $f$ between the chambers 62 26, the ring $d$, having the flange $d'$, forming a cover for the chamber 62, the ring $h$, having the flange $h'$, forming a cover for the chamber 26, the movable cover $g$, provided with a groove $f'$, into which the flange $f$ extends, ports communicating between the chambers $b$ 62 and $b'$ 26, supply-pipes communicating with the chambers $b'$ 26, and return-pipes communicating with the chambers $b$ 62, as set forth.

4. A steam-joint comprising in its construction a casing provided with the concentric chambers $b$ $b'$ and 62 26 and having the annular flange $f$ between the chambers 62 26, the ring $d$, having the flange $d'$, forming a cover for the chamber 62, the ring $h$, having the flange $h'$, forming a cover for the chamber 26, the movable cover $g$, provided with a groove $f'$, into which the flange $f$ extends, ports communicating between the chambers $b$ 62 and $b'$ 26, supply-pipes communicating with the chambers $b'$ 26, and return-pipes communicating with the chambers $b$ 62, and packing interposed between said casing, cover, rings, pipes, and flanges, as set forth.

5. A steam-joint comprising in its construction a casing provided with concentric chambers or reservoirs $b$ $b'$ and concentric packing-chambers and having a solid face 59 and a raised seat, and provided, also, with chambers 62 26, ports communicating between the reservoirs $b$ $b'$ and steam-chambers 62 26, the interior rings $d$ $h$, provided, respectively, with the flanges $d'$ $h'$, extending into the steam-chambers 62 26, and provided with ports, and a movable cover provided with direct and return pipes communicating with the ports in the flanges $d'$ $h'$, as set forth.

6. A steam-joint comprising in its construction a casing provided with chambers or reservoirs $b$ $b'$ and flange $f$ and having a solid face 59 and a raised seat, and provided, also, with the steam-chambers 62 26, ports communicating between the reservoirs $b$ $b'$ and steam-chambers 62 26, the interior rings $d$ $h$, provided, respectively, with flanges $d'$ $h'$, extending into the chambers 62 26, and provided with ports, a movable cover provided with an annular groove $f'$, into which the flange $f$ extends, and having direct and return pipes communicating with the ports in the flanges $d'$ $h'$, and a spring bearing on the cover, as set forth.

7. A steam-joint comprising in its construction a casing $a'$, provided with concentric chambers or reservoirs $b$ $b'$ and annular flange $f$ and having a solid face 59 integral with a raised seat, and provided, also, with the annular steam-chambers 62 26, ports communicating between the reservoirs $b$ $b'$ and steam-chambers 62 26, the interior rings $d$ $h$, provided, respectively, with flanges $d'$ $h'$, extending into the chambers 62 26, and provided with ports, a movable cover provided with an annular groove $f'$, into which the flange $f$ extends, and having direct and return pipes communicating with the ports in the flanges $d'$ $h'$, packing on opposite sides of the flanges, disks, and pipes, and a spring bearing on the movable cover, as set forth.

8. A steam-joint comprising in its construction a casing provided with one or more concentric reservoirs $b\ b'$, solid face 59, integral with a raised seat, annular chambers 62, and ports communicating between the reservoirs $b\ b'$ and steam-chambers 62, the sleeve $o$ at the center, the flanges $d\ h$, provided, respectively, with the flange projections $d'\ h'$, extending into the annular chambers 62, and provided with ports communicating with the ports leading from the supplies or reservoirs $b\ b'$ to the steam-chambers 62, a ring adapted to turn on the sleeve $o$, a groove 52 in the outer casing, with drip attached, packing between the face 59 and ring, a spring-bearing comprising the rotary disk, and packing with spring and screw, and the belt $o'$, and coupling for connecting joints in either direction, as set forth.

In testimony whereof I have signed my name to this specification, in the presence of two subscribing witnesses, this 1st day of December, A. D. 1891.

JOHN B. MORGAN.

Witnesses:
ARTHUR W. CROSSLEY,
A. D. HARRISON.